(12) United States Patent
Youn

(10) Patent No.: US 6,493,298 B1
(45) Date of Patent: Dec. 10, 2002

(54) METHOD OF CONTROLLING REPRODUCTION SPEED OF OPTICAL DISK

(75) Inventor: Jeong-Chae Youn, Pyoungtack (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 09/605,744

(22) Filed: Jun. 29, 2000

(30) Foreign Application Priority Data

Jun. 29, 1999 (KR) ......................................... 1999-25492

(51) Int. Cl.[7] ................................................. G11B 7/00
(52) U.S. Cl. .................. 369/47.1; 369/47.29; 369/47.36
(58) Field of Search ............................ 369/47.1, 47.32, 369/47.29, 47.33, 47.34, 47.36, 47.38, 47.45, 47.49

(56) References Cited

U.S. PATENT DOCUMENTS

| 5,740,143 | A | * | 4/1998 | Suetomi | 369/60 |
| 5,822,288 | A | * | 10/1998 | Shinada | 369/54 |
| 6,108,286 | A | * | 8/2000 | Eastty | 369/48 |
| 6,115,337 | A | * | 9/2000 | Takagi et al. | 369/54 |
| 6,269,061 | B1 | * | 7/2001 | Shimizume et al. | 369/47.3 |
| 6,310,848 | B1 | * | 10/2001 | Ueki | 369/53.37 |

FOREIGN PATENT DOCUMENTS

| JP | 8-235770 | * | 9/1996 | 369/54 |

* cited by examiner

Primary Examiner—Nabil Hindi
(74) Attorney, Agent, or Firm—Birch, Stewart, Kolasch & Birch, LLP

(57) ABSTRACT

A method for controlling reproduction speed of an optical disk is disclosed in which when a data recorded in an optical disk is read, stored and transmitted to a connected instrument through a digital interface, the speed in reading and reproducing the data recorded in the optical disk is controlled to be varied at a high speed or at a low speed according to a transmission rate or a residual amount of the stored data. By doing that, the output image is prevented from temporary pausing and noise images such as a flicker is originally prevented from outputting.

2 Claims, 5 Drawing Sheets

METHOD OF CONTROLLING REPRODUCTION SPEED OF OPTICAL DISK

BACKGROUND OF THE INVENTION

1. Field of the Invention

The present invention relates to a method for controlling reproduction speed of an optical disk that is suitable to an optical disk apparatus such as a CD-ROM driver for reproducing recorded data and transmitting it to a connected instrument through a digital interface.

2. Description of the Background Art

Construction and operation of an optical disk apparatus for reading and reproducing a data recorded in an optical disk such as a CD or a CD-ROM and transmitting it to a personal computer (PC) connected thereto through a digital interface will now be described with reference to the accompanying drawings, especially, taking an example of a CD-ROM driver that reads and reproduces a data recorded in a CD-ROM at a high speed for transmission and a personal computer (PC) that is connected to the CD-ROM driver through a digital interface to receive the data therefrom.

FIG. 1 is a schematic view showing a connection between an optical disk apparatus, i.e., a CD-ROM driver, and a personal computer (PC) in accordance with a conventional art.

As shown in the drawing, the CD-ROM driver includes an optical pick-up (P/U) 2 for reading a data recorded in an optical disk such as a CD-ROM; a wave filtering/shaping unit 3 for filtering a signal read by the optical pick-up 2 and outputting it as an RF (radio frequency) signal; a digital signal processing (DSP) unit 4 for processing the RF signal to be a digital signal; a buffer 5 for temporarily storing the processed digital signal; an interface (I/F) unit 6 for transmitting the output signal of the digital signal processing unit 4 or the digital signal temporarily stored in the buffer 5 to a connected personal computer; a servo/driver 7 for varying the rotation speed of the optical disk 1 and the data reading position of the optical pick-up 2; and a MICROCOMPUTER 8 for outputting a control signal corresponding to a key input by a user.

The personal computer receives the digital signal, that is, a data, transmitted through the interface unit 6 as well as transmitting and receiving a control signal (Hold, Ready) for controlling operations of the MICROCOMPUTER.

Data transmission by the CD-ROM driver 'C' connected through the digital interface and corresponding reproducing operation will now be described with reference to FIG. 2.

FIG. 2 is a flow chart of data transmission between the conventional optical disk apparatus and the personal computer and a corresponding operation, which, especially, is a flow chart of transmission of a data read and reproduced from the CD-ROM driver 'C' to the personal computer 20 connected through the digital interface unit, and a corresponding reproducing operation of the CD-ROM driver.

First, with reference to FIG. 1, a data recorded in the optical disk 1 is read by the optical pick-up 2 and then converted into an RF signal, that is, a high frequency signal, by the wave filtering/shaping unit 3 so as to be inputted to the digital signal processing unit 4. Then, the digital signal processing unit 4 processes the RF signal to be a digital signal and temporarily stores it in the buffer 5 (S10).

Thereafter, the digital signal, that is, a data, temporarily stored in the buffer 5 is transmitted to the personal computer 20 connected through the interface 6 (S11). At this time, the data processing speed for reading and storing the data, that is, the reproduction speed, is as fast as it can be increased to 48 times speed at its maximum, whereas, the transmission speed of transmitting a data to the personal computer 20 through the interface 6 is as low as one time speed or two times speed in case of a real time data such as a motion picture data.

Therefore, in case that the reproduction speed of the CD-ROM driver is as high as 48 times speed, the personal computer 20 transmits a control signal (Hold, '1') instructing to temporarily stop data transmission to the MICROCOMPUTER 8 of the CD-ROM driver through the interface unit 6.

Upon receipt of the temporary stoppage control signal (Hold, '1') (S12), the MICROCOMPUTER 8 controls in a manner that the data transmission operation is stopped (S13) and controls the operation of the servo/driver 7 so that the data reading operation of the optical pick-up 2 is in pause (S14).

The temporary stoppage of data reading operation is made by a tracking operation in which track jumping is repeatedly performed so as for the optical pick-up 2 to repeatedly search the same recording operation in a state that the optical disk 1 is being rotated at a high speed.

Thereafter, when a control signal (Ready, '0') instructing a resumption of data transmission is transmitted to the MICROCOMPUTER 8 through the interface unit 6 (S15), the MICROCOMPUTER 8 releases the data reading temporary pause (Pause) mode of a current operation mode (S16) and controls the operation of the servo/driver 7 so that the data reading operation is resumed by the optical pick-up 2.

At this time, a recording position of a corresponding optical disk 1 is searched at the time point when the reading operation was temporarily stopped, to perform data reading operation from the corresponding recording position. And then, data reading, storing and transmitting operations are repeatedly performed until the completion of reproducing (S17) in the same manner as stated above.

Accordingly, data transmission between the CD-ROM driver that reads, stores and transmits the data recorded in the optical disk 1 at a high speed and the personal computer 20 that receives and processes the data at a low speed.

However, due to the speed difference between the data reading speed in the CD-ROM driver and the data receiving speed of the personal computer 20, data reading pausing and releasing operations should be repeatedly performed, which requires an accurate track jumping operation or searching operation.

In addition, in case that track jumping operation and searching operation are not made accurately and quickly, the buffer for temporarily storing the transmission data is short of data, resulting in that an output image comes to a pause temporarily or a noise image such as a flicker is outputted.

SUMMARY OF THE INVENTION

Therefore, an object of the present invention is to provide a method for controlling reproduction speed of an optical disk in which when a data recorded in an optical disk recorded in an optical is read, stored and transmitted to a connected instrument through a digital interface, the speed in reading and reproducing the data recorded in the optical disk is controlled to be varied at a high speed or at a low speed according to a transmission rate or a residual amount of the stored data.

To achieve these and other advantages and in accordance with the purpose of the present invention, as embodied and broadly described herein, there is provided a method for controlling reproduction speed of an optical disk including: a first step of reproducing a data recorded in an optical disk and storing it; a second step of externally transmitting the stored data through a digital interface; and a third step of varying the data reproduction speed of the optical disk according to the transmission rate of the data.

In order to achieve the above object, there is also provided a method for controlling reproduction speed of an optical disk including: a first step of reproducing a data recorded in an optical disk and storing it; a second step of externally transmitting the stored data through a digital interface; and a third step of monitoring a residual amount of the stored data, and varying the reproduction speed of the data of the optical disk if the residual amount of the stored data exceeds a reference value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
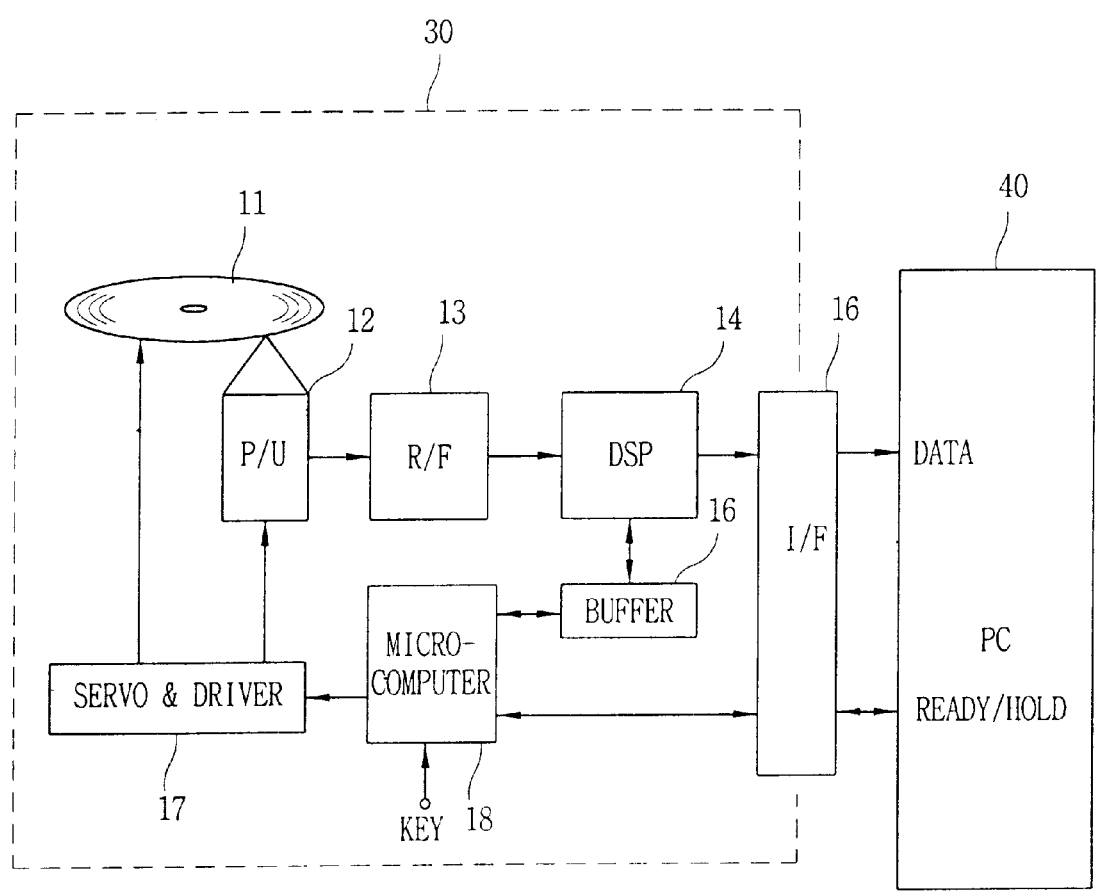
FIG. 3 is a schematic view of showing a connection between an optical disk apparatus and a personal computer adopting a method for controlling reproduction speed of an optical disk in accordance with the present invention.

FIG. 3 is a schematic view of showing a connection between an optical disk apparatus and a personal computer adopting a method for controlling reproduction speed of an optical disk in accordance with the present invention, which, especially, shows a CD-ROM driver 30 and a personal computer 40 connected through a digital interface unit.

As shown in the drawing, first, the CD-ROM driver 30 includes an optical pick-up P/U 12 for reading a data recorded in an optical disk such as a CD-ROM; a wave filtering/shaping unit 13 for filtering a signal read by the optical pick-up 12 and outputting it as an RF signal; a digital signal processing (DSP) unit 14 for processing the RF signal to be a digital signal; a buffer 15 for temporarily storing the processed digital signal; an interface (I/F) unit 16 for transmitting the output signal of the digital signal processing unit 14 or the digital signal temporarily stored in the buffer 5, that is, a data, to a connected personal computer; a servo/driver 17 for varying the rotation speed of the optical disk 1 and the data reading position of the optical pick-up 12; and a MICROCOMPUTER 18 for outputting an operation control signal corresponding to a key input by a user.

The personal computer receives the digital signal transmitted through the interface unit 16 as well as transmitting and receiving a control signal (i.e., Hold, Ready, etc) for controlling an operation of the MICROCOMPUTER.

The MICROCOMPUTER 18 positioned at the CD-ROM driver 30 detects a transmission rate of the data transmitted through the interface unit 16 to variably control the reproduction speed of reading and reproducing the data recorded in the optical disk 11, or detects the amount of the data remaining in the buffer 16 that temporarily stores the data to vary the reproduction speed of reproducing the data recorded in the optical disk 1.

The method for controlling reproduction speed of an optical disk, in which the reproduction speed of the optical disk 1 is controlled to be varied at a high speed or at a low speed according to the transmission rate in transmitting a data through the interface unit 16 or the data amount remaining in the buffer 16, will now be described in detail with reference to the accompanying drawings.

Figure 4:
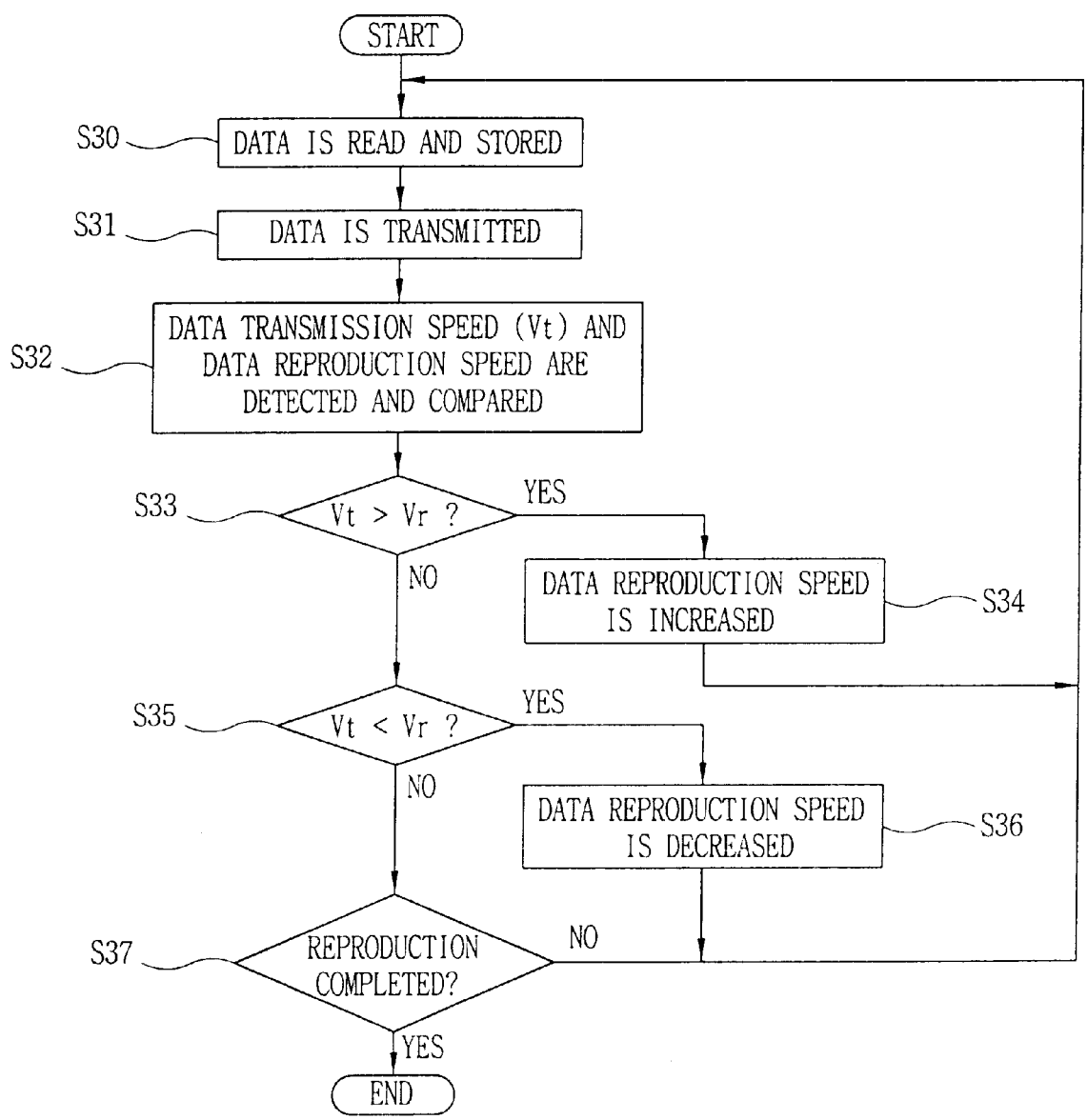
FIG. 4 is a flow chart of operations according to the method for variably controlling reproduction speed of an optical disk in accordance with one embodiment of the present invention.

FIG. 4 is a flow chart of operations according to the method for variably controlling reproduction speed of an optical disk in accordance with one embodiment of the present invention, especially, operations according to the method for variably controlling the reproduction speed of the optical disk according to the transmission rate of the data transmitted through the interface unit 16.

First, with reference to FIG. 3, as described above, the data recorded in the optical disk 11 is read by the optical pick-up 12, converted to an RF signal of a high frequency signal by the wave filtering/shaping unit 13 and inputted to the digital signal processing unit 14. Then, the digital signal processing unit 14 processes the inputted RF signal and temporarily stores it in the buffer 15 (S30).

Thereafter, the digital signal, that is, the data, temporarily stored in the buffer 15 is transmitted to the personal computer connected through the interface unit 16 (S31); for which the MICROCOMPUTER 18 detects the transmission speed Vt of the data transmitted to the personal computer and the reproduction speed Vr of the data read and reproduced from the optical disk 1.

The data transmission speed Vt can be obtained by calculating the amount of data read and transmitted from the buffer 15 per hour, and the data reproduction speed Vr can be obtained by calculating the amount of data read and reproduced from the optical disk 11 per hour.

Thereafter, the MICROCOMPUTER 18 compares the detected data transmission speed Vt and the data reproduction speed Vr (S32). Upon comparison, in case that the data transmission speed Vt is faster than the data reproduction speed Vr (S33), the MICROCOMPUTER controls the servo/driver 17 so that the reproduction speed of the data read and reproduced from the optical disk 11 is increased to a high speed (S34).

Meanwhile, upon comparison, if the data transmission speed Vt is slower than the data reproduction speed Vr (S35), the MICROCOMPUTER controls the servo/driver 17 so that the reproduction speed of the data read and reproduced form the optical disk 11 is decreased to a low speed (S36).

Meanwhile, in case that the data transmission speed Vt and the data reproduction speed Vr are the same each other, the MICROCOMPUTER 18 maintains the current data reproduction speed so that the amount of the data temporarily stored in the buffer 15 is maintained in a predetermined range, and the same operations are repeatedly performed until the completion of the reproduction (S37).

Figure 1:
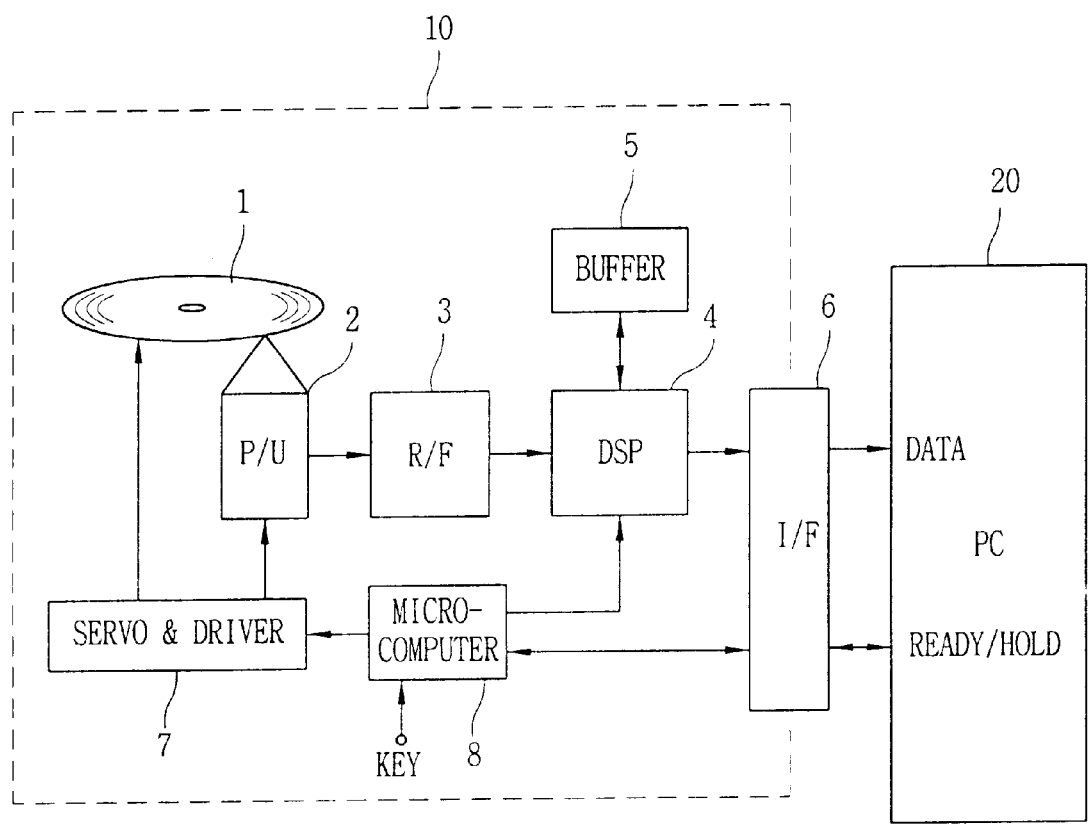
FIG. 1 is a schematic view showing a connection between an optical disk apparatus and a personal computer in accordance with a conventional art.
Figure 2:
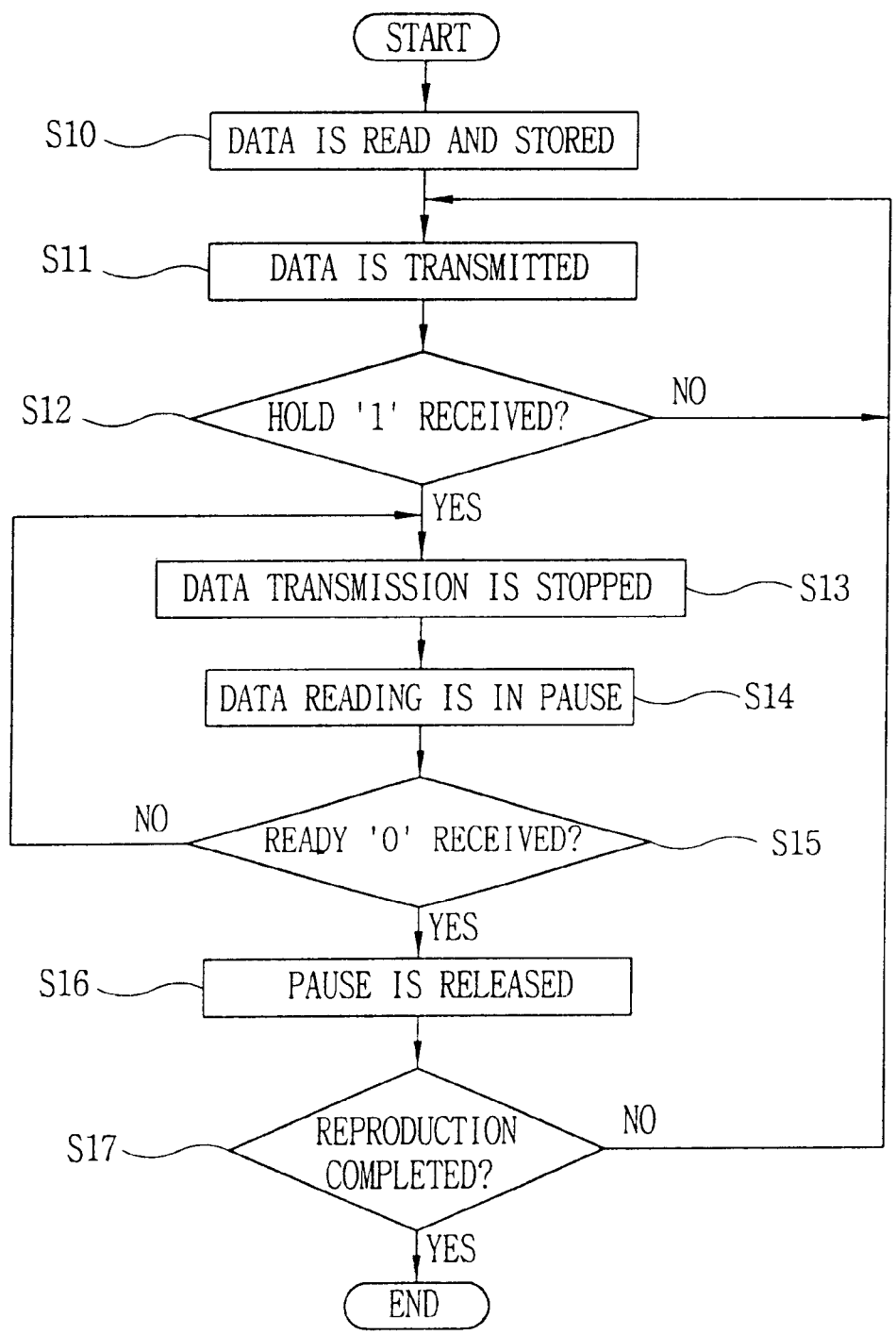
FIG. 2 is a flow chart of operations of data transmission between the optical disk apparatus and the personal computer in accordance with the conventional art.

For reference, apart from the above operations, in case that a control signal, for example, a control signal (Hold, '1') instructing to temporarily stop data transmission or a control signal (Ready, '0') instructing to resume data transmission, is received to the MICROCOMPUTER 18 from the personal computer through the interface unit 16, the track jumping operation or the searching operation as described above with reference to FIG. 2 is performed. But such track jumping operation or the searching operation as in the conventional art is not necessary because of the operations in series (S30~S37) of the present invention.

In this manner, data is stably transmitted by variably controlling the data reproduction speed at a high speed or at a low speed according to the data transmission rate on the basis of the data transmission speed Vt and the data reproduction speed Vr.

Figure 5:
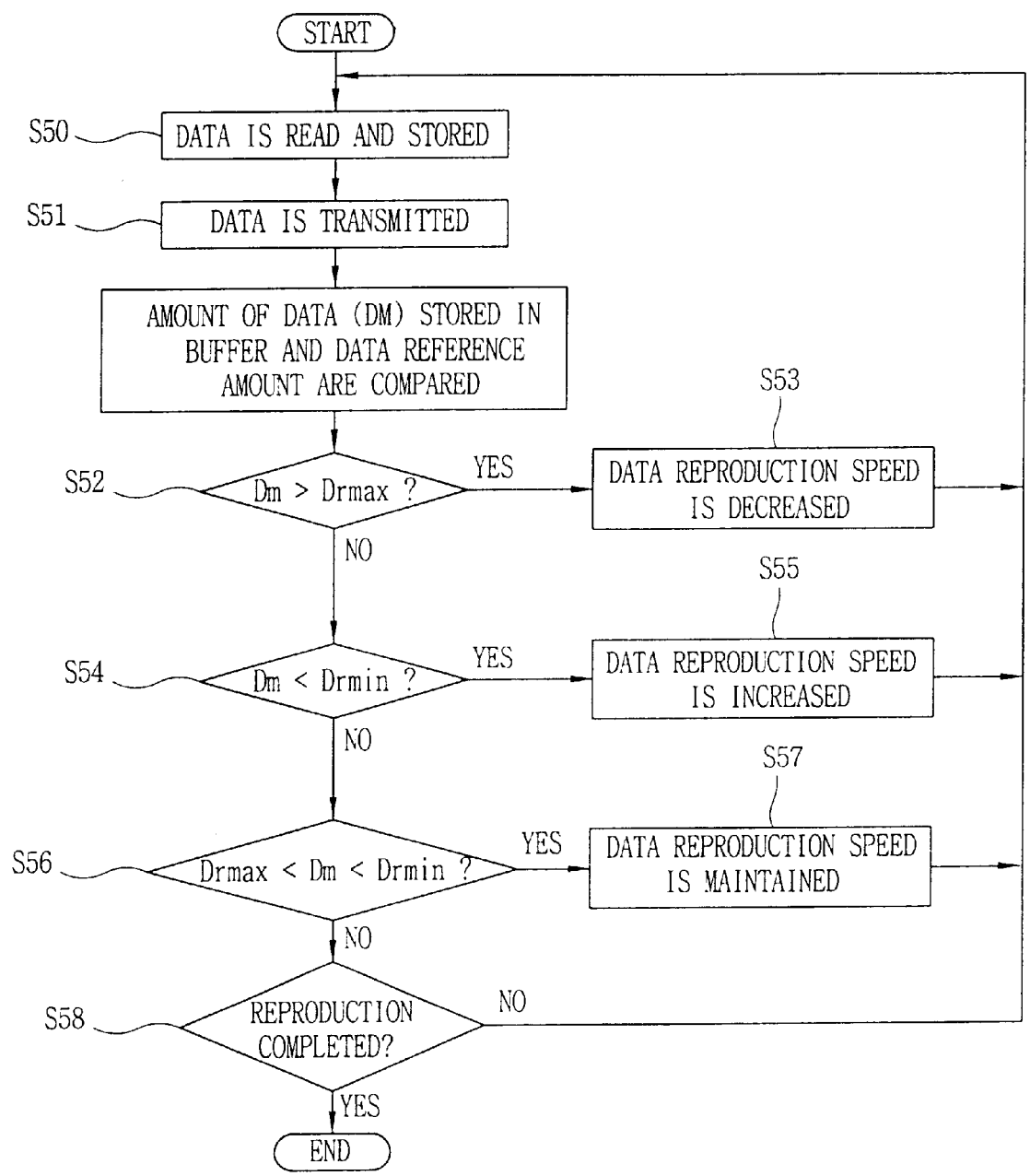
FIG. 5 is a flow chart of operations according to the method for controlling reproduction speed of an optical disk in accordance with one embodiment of the present invention.

FIG. 5 is a flow chart of operations according to the method for controlling reproduction speed of an optical disk in accordance with one embodiment of the present invention, especially, operations according to the method for variably controlling the reproduction speed of the optical disk according to the amount of data stored in the buffer 15.

First, as in the above descriptions, the digital signal processed by the digital signal processing unit 14, that is, a data, is temporarily stored (S50) in the buffer 15 (S50) and transmitted to the personal computer connected through the interface unit 16 (S51). At this time, the MICROCOMPUTER 18 detects the amount of the data (Dm) stored in the buffer 15 and compares it with a data reference amount (Dr) adequate in consideration of the data capacity of the buffer 15.

The data reference amount Dr is determined in a predetermined range (Drmin~Drmax) having the maximum value and the minimum value, taking a capacity of the buffer 15 into consideration in preparation for case that the data stored in the buffer 15 is not enough to be transmitted or the data stored in the buffer 15 exceeds the capacity, not allowing the data as read and reproduced to be stored.

Upon comparison, in case that the amount of data Dm stored in the buffer exceeds the maximum reference amount Drmax (S52), the MICROCOMPUTER controls the servo/driver 17 so that the reproduction speed of reading and reproducing the data from the optical disk 11 is reduced to a low speed (S53).

Upon comparison, in case that the amount of data Dm stored in the buffer 15 is less than the minimum reference amount Drmin (S54), the MICROCOMPUTER controls the servo/driver 17 so that the reproduction speed of reading and reproducing the data from the optical disk 11 is increased to a high speed (S55).

Meanwhile, upon comparison, in case that the amount of the data Dm stored in the buffer 15 is between the maximum reference amount and the minimum reference amount (between Drmin and Drmax) (S56), the current reproduction speed of data is maintained so that the amount of the data temporarily stored in the buffer 15 is maintained at a predetermined range (S57), and the same operations as described above are repeatedly performed until the completion of the reproducing (S58).

Likewise as in the first embodiment of the present invention, in case that a control signal (Hold, '1', Ready '0') is received to the MICROCOMPUTER 18 from the personal computer through the interface unit 16, the track jumping operation or the searching operation as described above with reference to FIG. 2 is performed. But such track jumping operation or the searching operation as in the conventional art is not necessary because of the operations in series (S50~S58) of the present invention.

In this manner, data is stably transmitted by variably controlling the data reproduction speed at a high speed or at a low speed according to the amount of the data stored in the buffer 15.

As so far described, according to the method for controlling reproduction speed of an optical disk of the present invention, when the data recorded in the optical disk is read, stored and transmitted to a connected instrument through the digital interface, the reproduction speed of reading and reproducing the data recorded in the optical disk is controlled to be varied to a high speed or to a low speed, so that stopping and releasing operations, that are repeatedly performed in data reading due to the speed differences between the data reproduction speed of the optical disk apparatus such as a CD-ROM driver and the data receiving speed of the connected instrument, are not necessary. Resultantly, the temporary pause for the output image can be prevented and a noise image such as a flicker is prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for controlling reproducing speed of an optical disk comprising:
   a first step of reproducing a data recorded in an optical disk and storing it;
   a second step of externally transmitting the stored data to a computer through a digital interface; and
   a third step of varying the data reproduction speed of the optical disk, wherein the data reproduction speed from the optical disk and the data transmission speed to the computer are compared to each other, and in case that the data transmission speed is faster than the data reproduction speed, the data reproduction speed is controlled to be as fast as the data transmission speed, while in case that the data reproduction speed is faster than the data transmission speed, the data reproduction speed is controlled to be as slow as the data transmission speed.

2. The method according to claim 1, wherein in the third step, the reproduction speed is reduced according to the transmission rate of the data as transmitted.

* * * * *